US008310158B2

(12) United States Patent
Coplin et al.

(10) Patent No.: US 8,310,158 B2
(45) Date of Patent: Nov. 13, 2012

(54) LED LIGHT ENGINE APPARATUS

(75) Inventors: Barry Cason Coplin, Fairway, KS (US); John Robert Householder, Reading, MA (US); Clifford Earl Wilson, Holt, MO (US)

(73) Assignee: EcoFit Lighting, LLC, Lenexa, KS (US)

( * ) Notice: Subject to any disclaimer, the term of this patent is extended or adjusted under 35 U.S.C. 154(b) by 380 days.

(21) Appl. No.: 12/565,584

(22) Filed: Sep. 23, 2009

(65) Prior Publication Data
US 2011/0068708 A1 Mar. 24, 2011

(51) Int. Cl.
*H01J 7/44* (2006.01)
(52) U.S. Cl. ............................................. 315/32; 315/33
(58) Field of Classification Search .................... 315/32, 315/33
See application file for complete search history.

(56) References Cited

U.S. PATENT DOCUMENTS

| D194,479 S | 1/1963 | Pettengill |
|---|---|---|
| 3,183,346 A | 5/1965 | Spaulding, et al. |
| D278,461 S | 4/1985 | Pepall |
| 5,688,042 A | 11/1997 | Madadi et al. |
| D391,659 S | 3/1998 | Gaskins et al. |
| 5,892,621 A | 4/1999 | McGregor et al. |
| 6,045,240 A | 4/2000 | Hochstein |
| D439,695 S | 3/2001 | Compton et al. |
| 6,504,301 B1 | 1/2003 | Lowery |
| 6,580,228 B1 | 6/2003 | Chen et al. |
| 6,676,279 B1 | 1/2004 | Hubbell et al. |
| 6,705,744 B2 | 3/2004 | Hubbell et al. |
| 6,936,855 B1 | 8/2005 | Harrah |
| 6,942,361 B1 | 9/2005 | Kishimura et al. |
| 6,986,593 B2 | 1/2006 | Rhoads et al. |
| 7,014,336 B1 | 3/2006 | Ducharme et al. |
| D531,342 S | 10/2006 | Kauffman et al. |
| 7,148,632 B2 | 12/2006 | Berman et al. |
| D535,774 S | 1/2007 | Weston et al. |
| 7,347,706 B1 | 3/2008 | Wu et al. |

(Continued)

FOREIGN PATENT DOCUMENTS
WO    WO 2008135927 A1 * 11/2008
(Continued)

OTHER PUBLICATIONS

International Search Report with Written Opinion of the International Searching Authority dated Sep. 17, 2010, regarding application PCT/US2010/040866, 13 pages.

(Continued)

*Primary Examiner* — Douglas W Owens
*Assistant Examiner* — Jianzi Chen
(74) *Attorney, Agent, or Firm* — Polsinelli Shughart PC

(57) ABSTRACT

A light emitting diode (LED) light engine is provided for use in a light fixture to enable improved and efficient dissipation of heat generated in the light fixture. The light engine includes a circuit board that includes multiple LEDs for emitting light. The light engine includes a chassis that has a plurality of upper fins that extend upward from a central flanged portion to dissipate heat generated by the LEDs into the lighting fixture. The circuit board is mounted to a mounting surface on the chassis that is surrounded by a fin wall that depends from the central flanged portion. The chassis also has a plurality of lower fins that extend outward from an outer surface of the fin wall to dissipate heat out of the fixture and into the ambient air environment.

71 Claims, 10 Drawing Sheets

U.S. PATENT DOCUMENTS

| | | |
|---|---|---|
| 7,350,936 B2 | 4/2008 | Ducharme et al. |
| D568,521 S | 5/2008 | Compton |
| D570,025 S | 5/2008 | Walker |
| D573,288 S | 7/2008 | Xu et al. |
| D573,290 S | 7/2008 | Shuai et al. |
| D577,455 S | 9/2008 | Zheng et al. |
| D578,697 S | 10/2008 | Zheng et al. |
| 7,431,489 B2 | 10/2008 | Yeo et al. |
| D580,577 S | 11/2008 | Wang et al. |
| D596,777 S | 7/2009 | Gordin |
| D599,936 S | 9/2009 | Wang et al. |
| D599,941 S | 9/2009 | Wang et al. |
| D599,942 S | 9/2009 | Zheng |
| 7,674,018 B2 | 3/2010 | Holder et al. |
| 7,794,119 B2 | 9/2010 | Venhaus |
| 2002/0163805 A1 | 11/2002 | Hubbell et al. |
| 2004/0105264 A1 | 6/2004 | Spero |
| 2005/0207159 A1 | 9/2005 | Maxik |
| 2006/0006821 A1 | 1/2006 | Singer et al. |
| 2006/0092639 A1 | 5/2006 | Livesay et al. |
| 2007/0076413 A1 | 4/2007 | Mingozzi |
| 2007/0076415 A1 | 4/2007 | Chou et al. |
| 2007/0081339 A1 | 4/2007 | Chung et al. |
| 2007/0081340 A1 | 4/2007 | Chung et al. |
| 2007/0195527 A1 | 8/2007 | Russell |
| 2007/0201225 A1 | 8/2007 | Holder et al. |
| 2007/0201255 A1 | 8/2007 | Campbell et al. |
| 2007/0242461 A1 | 10/2007 | Reisenauer et al. |
| 2008/0080196 A1 | 4/2008 | Ruud et al. |
| 2009/0021933 A1 | 1/2009 | Mayer et al. |
| 2009/0073688 A1 | 3/2009 | Patrick |
| 2009/0073689 A1 | 3/2009 | Patrick |
| 2009/0097262 A1 | 4/2009 | Zhang et al. |
| 2009/0126905 A1 | 5/2009 | Dinh |
| 2009/0168416 A1 | 7/2009 | Zhang et al. |
| 2009/0185374 A1 | 7/2009 | Wu et al. |
| 2009/0303715 A1 | 12/2009 | Takasago et al. |
| 2009/0303725 A1 | 12/2009 | Chang |
| 2010/0103668 A1 | 4/2010 | Lueken et al. |
| 2010/0118534 A1 | 5/2010 | Lo |
| 2010/0134016 A1* | 6/2010 | York et al. .................. 315/113 |
| 2010/0134046 A1 | 6/2010 | Holder et al. |
| 2010/0182786 A1 | 7/2010 | Hein |
| 2010/0202140 A1 | 8/2010 | Rooymans et al. |
| 2010/0302790 A1 | 12/2010 | Yen |

FOREIGN PATENT DOCUMENTS

| | | |
|---|---|---|
| WO | 2009081382 A1 | 7/2009 |

OTHER PUBLICATIONS

CAFP Electronical Technology Co., Ltd, led streetlight heat sink, http://winszhang.en.ecplaza.net/2.asp, Retrieved Sep. 22, 2009, 3 pages.

* cited by examiner

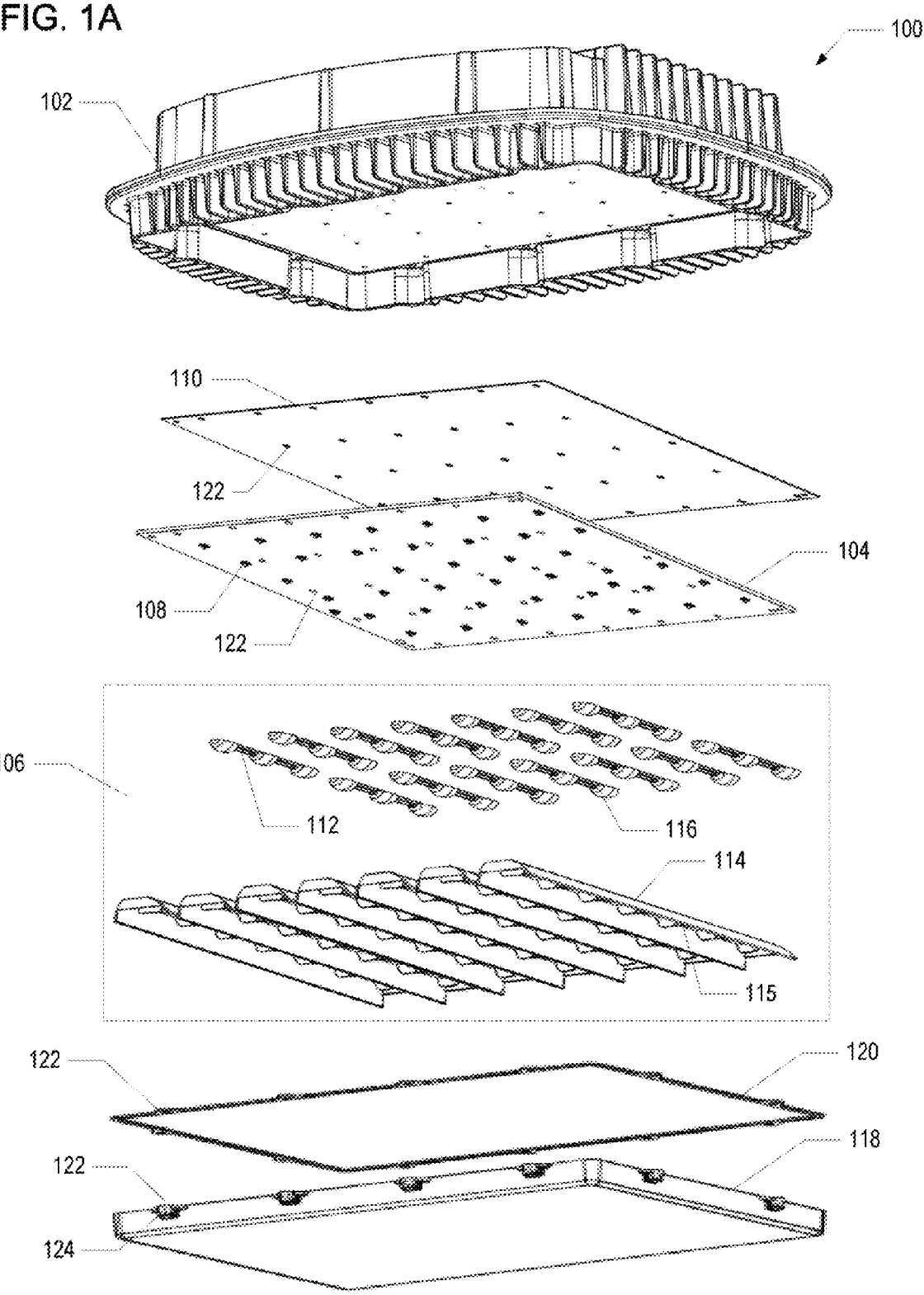

LED LIGHT ENGINE APPARATUS

RELATED APPLICATIONS

Not Applicable.

FEDERALLY SPONSORED RESEARCH OR DEVELOPMENT

Not Applicable.

COMPACT DISK APPENDIX

Not Applicable.

BACKGROUND

Conventional lighting products use various lighting technologies including incandescent, fluorescent, and high intensity discharge (HID) technologies to generate visible light. However, more and more lighting products are using Solid State Lighting (SSL) technology to meet indoor and outdoor lighting requirements for a variety of lighting applications. SSL technology uses electronic components, such as integrated circuits, liquid-crystal displays, and light emitting diodes (LEDs), to generate visible light. Lighting fixtures that use SSL technology typically consume less energy and have a longer operating life as compared to lighting fixtures that use incandescent, fluorescent, or HID lighting technologies.

A single LED cannot emit a sufficient amount of light for most outdoor or indoor lighting applications. As a result, multiple LEDs are generally required to provide the minimum amount of light or illuminance required to meet project specifications for a particular application. For example, multiple LEDs are typically mounted on a printed circuit board ("PCB") and configured with separate optics, either refractive of reflective, such that the light emitted from each LED can be dispersed in a desired direction. Unfortunately, a significant amount of heat can be generated when using such a multiple LED configuration. If the heat cannot be quickly removed, components within the lighting fixture, including the LEDs, can overheat and, thereby, significantly reduce the lighting efficiency and service life of the lighting fixture.

SUMMARY

According to one aspect, a light engine is provided that includes at least one power connector to connect to a power source of a luminaire. The light engine also includes an alternating current (AC) to direct current (DC) power converter to receive the AC power via the at least one power connector and to convert the AC power to DC power at a DC power level. The light engine also includes a circuit board. The circuit board includes a plurality of light emitting diodes to receive the DC power and to emit light. The circuit board also includes lighting optics to distribute the light emitted from the LEDs from the luminaire in a desired light pattern. The light engine also includes a chassis that has a first side that includes a plurality of first fins that extend upward to dissipate heat in a first direction. The chassis has a second side that includes a mounting surface for the circuit board and a fin wall that surrounds the mounting surface. A plurality of second fins extends outward from an outer surface of the fin wall to dissipate heat in a second direction.

According to another aspect, a lighting fixture is provided that includes a light engine. The lighting fixture includes a housing and a terminal block that supplies AC power. The light engine includes an AC to DC power converter to receive the AC power from the terminal block via at least one power connector and to convert the AC power to DC power at a DC power level. The light engine also includes a circuit board to receive the DC power at the DC power level from the AC to DC power converter. The circuit board includes a plurality of light emitting diodes to receive the DC power and to emit light. The circuit board includes lighting optics to distribute the light emitted from the LEDs from the luminaire in a desired light pattern. The light engine also includes a chassis that mountably fits within the lighting fixture. The chassis has a central portion and a first side that includes a plurality of first fins that extend vertically upward from the central portion to dissipate heat in a first direction. The chassis also has a second side that includes a mounting surface for the circuit board and a fin wall that depends from the central portion and surrounds the mounting surface. A plurality of second fins extend horizontally outward from an outer surface of the fin wall to dissipate heat in a second direction.

According to another aspect, a light engine is provided for retrofitting an existing light fixture. The light engine includes at least one power connector to connect to a power source of the existing lighting fixture to convey AC power. The light engine also includes a current driver to receive the AC power via the at least one power connector and to convert the AC power to DC power at a DC power level. The light engine also includes a circuit board that includes a plurality of light emitting diodes to receive the DC power and to emit light. The circuit board also includes a plurality of optical lenses to disperse light. Each of the plurality of optical lenses is positioned over a different one of the LEDs. The circuit board also includes at least one optical reflector positioned over at least one of the optical lenses to reflect the light dispersed by the lenses to create the desired light pattern. The light engine also includes a chassis that has a first side that includes a plurality of first fins that extends to dissipate heat in a first direction. The light engine also has a second side that includes a mounting surface for the circuit board and a fin wall surrounding the mounting surface. A plurality of second fins extends outward from an outer surface of the fin wall to dissipate heat in a second direction. The chassis includes a central portion that has a mounting interface for mounting the chassis to a lid of the existing light fixture. The lid includes an opening, a retention clip, and at least one retention bracket. One end of the mounting interface is positioned beneath the retention bracket such that the plurality of second fins passes through the opening. An opposite end of the mounting interface is secured to the lid by the retention clip.

According to another aspect, a light engine is provided that includes a driver assembly. The driver assembly includes at least one power connector to connect to a power source of a luminaire to convey AC power. The driver assembly also includes an AC to DC power converter to receive the AC power via the at least one power connector and to convert the AC power to DC power at a DC power level. The driver assembly includes a processor to generate a control signal to control the AC to DC power converter to convert the AC power to the DC power at the DC power level. The light engine also includes a circuit board. The circuit board includes a plurality of light emitting diodes to receive the DC power and to emit light. The circuit board also includes lighting optics to distribute the light emitted from the LEDs from the luminaire in a desired light pattern. The light engine also includes a chassis that has a central portion. The chassis also has a first side that includes a plurality of first fins extending upward from the central portion to dissipate heat in a first direction. The light engine has a second side that includes a mounting surface for the circuit board and a fin wall that depends from the central portion and surrounds the mounting surface. The fin wall includes an inner surface that blocks at least a portion of the light from being emitted from the luminaire. A plurality of second fins extends outward from an outer surface of the fin wall to dissipate heat in a second direction.

According to another aspect, a light engine for a luminaire is provided. The luminaire includes a housing and a terminal block for supplying AC power. The light engine includes a driver assembly that includes at least one power connector to connect to the terminal block to convey the alternating current (AC) power. The driver assembly also includes an AC to direct current (DC) power converter to receive the AC power via the at least one power connector and to convert the AC power to DC power at a DC power level. The driver assembly also includes a processor to generate a control signal to control the AC to DC converter to convert the AC power to the DC power at the DC power level. The light engine also includes a circuit board comprising a plurality of LEDs to receive the DC power and to emit light. The light engine also includes lighting optics to distribute the light emitted from the LEDs from the luminaire in a desired light pattern. The light engine also includes a chassis that has a central portion. The chassis also has a first side that includes a plurality of first fins that extend vertically upward from the central portion to dissipate heat into an interior of the housing. The chassis has a second side that includes a mounting surface for the circuit board and a fin wall that depends from the central portion and surrounds the mounting surface. An inner surface of the fin wall blocks at least a portion of the light in the desired light pattern from being emitted from the luminaire. A plurality of second fins extend horizontally outward from an outer surface of the fin wall to dissipate heat directly into ambient air outside of the housing.

According to another aspect, a luminaire is provided that includes a light engine. The luminaire includes a housing and a terminal block that supplies AC power. The light engine includes an AC to DC power converter to receive the AC power from the terminal block via at least one power connector and to convert the AC power to DC power at a DC power level. The light engine also includes a circuit board to receive the DC power at the DC power level from the AC to DC power converter. The circuit board includes a plurality of light emitting diodes to receive the DC power and to emit light. The circuit board includes lighting optics to distribute the light emitted from the LEDs from the luminaire in a desired light pattern. The light engine also includes a chassis that has a central portion. The chassis also has a first side that includes a plurality of first fins that extends vertically upward from the central portion to dissipate heat into an interior of the housing. The chassis has a second side that includes a mounting surface for the circuit board and a fin wall that depends from the central portion and surrounds the mounting surface. An inner surface of the fin wall blocks at least a portion of the light in the desired light pattern from being emitted from the luminaire. A plurality of second fins extends horizontally outward from an outer surface of the fin wall to dissipate heat directly into ambient air outside of the housing.

BRIEF DESCRIPTION OF THE DRAWINGS

FIG. 1A is an isometric diagram depicting components of an LED light engine according to one aspect of the invention.

DETAILED DESCRIPTION

Figure 1B:
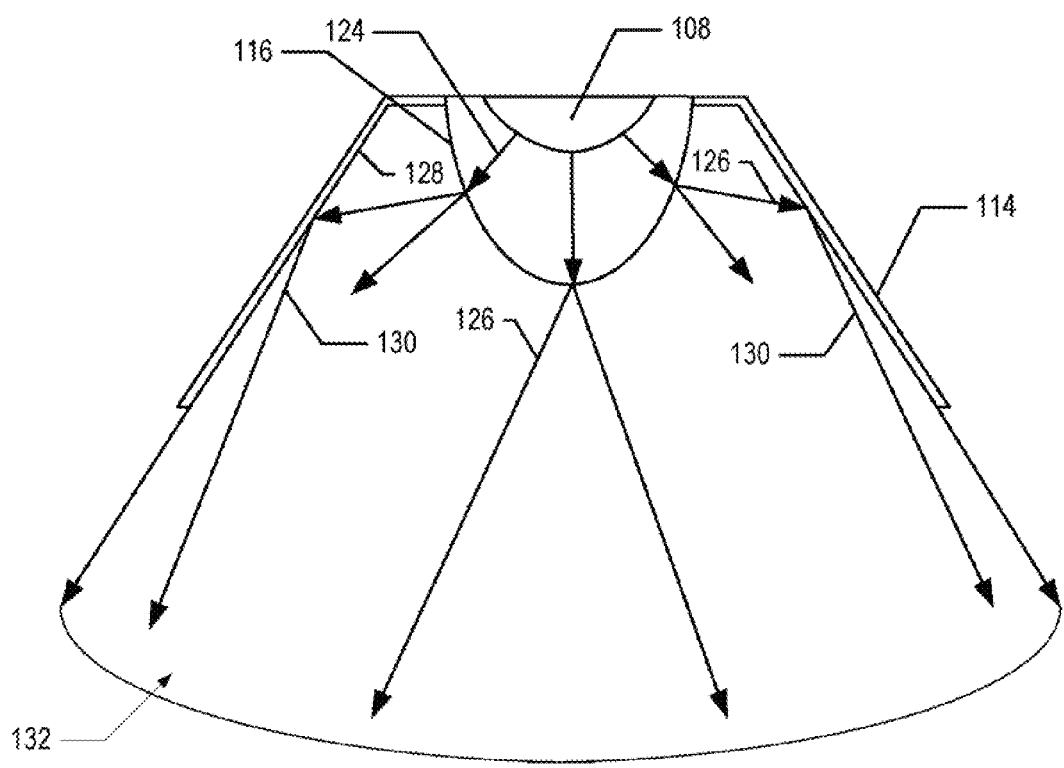
FIG. 1B depicts a light pattern generated by an LED and corresponding optics according to one aspect of the LED light engine.

Aspects of the LED light engine described herein enable the efficient dissipation of heat generated in a light fixture that uses multiple LEDs to generate light. According to another aspect, the LED light engine is configurable to fit a variety of existing lighting fixtures with minimal modification.

Referring to the drawings, an exemplary embodiment of a LED light engine is illustrated and generally indicated as 100 in FIG. 1. The LED light engine 100 includes a chassis body ("chassis") 102, a lighting circuit ("circuit") 104, and lighting optics ("optics") 106.

The chassis 102 is configured to fit within an opening of an existing or new light fixture, such as a streetlight luminaire. Although the LED light engine 100 is described herein in connection with streetlight luminaires, it is contemplated that the LED light engine 100 can be used with a variety of other fixtures including, but not limited to, parking lot lights, parking garage lights, exterior building lights, interior overhead lights, and/or display signage.

The circuit 104 is a printed circuit board (PCB) that has multiple LEDs 108 and is mounted to the chassis 102. According to one aspect, a thermal conducting pad 110 is positioned between the circuit 104 and the chassis 102 to assist in the transfer of heat generated by the LEDs 108 to the chassis 102.

Optics 106 include multiple optical lens assemblies 112 and multiple trough shaped reflectors 114. According to one aspect, each optical lens assembly 112 includes three optical lenses 116. Each optical lens assembly 112 is mounted to the lighting circuit 104 such that an optical lens 116 is positioned over each LED 108. Each optical lens 116 efficiently captures the light exiting a corresponding LED 108 and disperses the light.

A single reflector 114 surrounds a series of the optical lens assemblies 112. In the example configuration shown in FIG. 1, each reflector 114 surrounds six optical lenses 116 or two optical lens assemblies 112. The reflector 114 includes a reflective surface that substantially reflects the light emitted from each optical lens 116 into a desired lighting pattern. The combination of optical lens 116 and reflectors 114 create the overall desired light pattern for the targeted area of illumination. For example, if the LED light engine 100 is being used in connection with a street light luminaire, the optical lens 116 and reflectors 114 are configured to create patterns of illumination applicable to street light applications according to standards set forth by the Illumination Engineering Society of North America (IESNA). In addition to the optics 106 emitting light towards a desired target area, a lower side of the chassis 102 includes a fin wall that serves as a baffle to prevent or block light from being emitted or propagated in unwanted directions. For example, as described in more detail below, the fin wall controls or prevents light from a street light luminaire from being emitted above or below certain angles with respect to a horizontal reference plane intersecting the bottom of the chassis 102.

According to another aspect, an acrylic cover 118 mounts to the chassis 102 to cover and to protect the circuit 104 and optics 106 from environmental conditions. A gasket 120 can be positioned between the cover 118 and the chassis body 102 to provide a seal between the chassis 102 and the cover 118 to enhance protection from environmental conditions.

According to one aspect, the circuit 104, optics 106, cover 118, and/or gasket 120 may include openings 122 that enable mechanical fasteners to pass through for connection to the chassis 102. For example, as explained in more detail below, a mechanical fastener, such as a mounting screw, can be used to mount the circuit 104, optics 106, and cover 118 to the chassis 102.

The illumination pattern created by the LED light engine 100 is generally defined by the optics 106. For example, FIG. 1B depicts a cross section of a trough shaped reflector 114, an LED 108, and a lens 116 according to one aspect of the LED light engine 100. Light, as indicated by 124, is emitted by the LED 108 and dispersed by the lens 116. At least some of the dispersed light, as indicated by 126, strikes a sloped inner surface 128 of the reflector 114 and is reflected. The inner surface 128 of the trough is, for example, a reflective material that may be polished, anodized aluminum (also known as "specular aluminum"), semi-specular aluminum, or another type of reflective material that has the desired reflective and other structural properties for a reflector. According to one aspect, an aluminum coating is applied to inner surface of the reflector 114, such as a black polycarbonate polished reflector. The reflected light, as indicated by 130, is distributed downward in a light pattern 132 that is consistent with the shape of the reflector 114. For example, the angle at which the light pattern is distributed downward is consistent with the sloped sides of the reflector 114 and, thus, limits horizontal spread of illumination. As a result, a greater percentage of the illumination created by each LED 108 can be directed towards a target area for illumination.

As the LED light engine 100 includes multiple reflectors 114, the light pattern from each reflector 114 overlaps with at least one adjacent reflector 114 to produce the overall desired light pattern for a target illumination area. In one embodiment, the reflector 114 includes individual trough compartments 115 that are associated with each LED 108 and lens 116. The shape and/or structure of the lens and trough compartment 115, including the shape and/or structure and slope of the sides and/or walls of the trough compartment 115 and the reflective material on the trough component, define the light pattern for that lens and corresponding trough compartment 115, and all LEDs 108 and optics 106 define the light pattern for the target illumination area. As discussed above, the angle of the generated light pattern can be configured to create patterns of illumination applicable to street light applications according to standards set forth by IESNA, or standards set forth by any other lighting authority or organization.

Figure 2A:
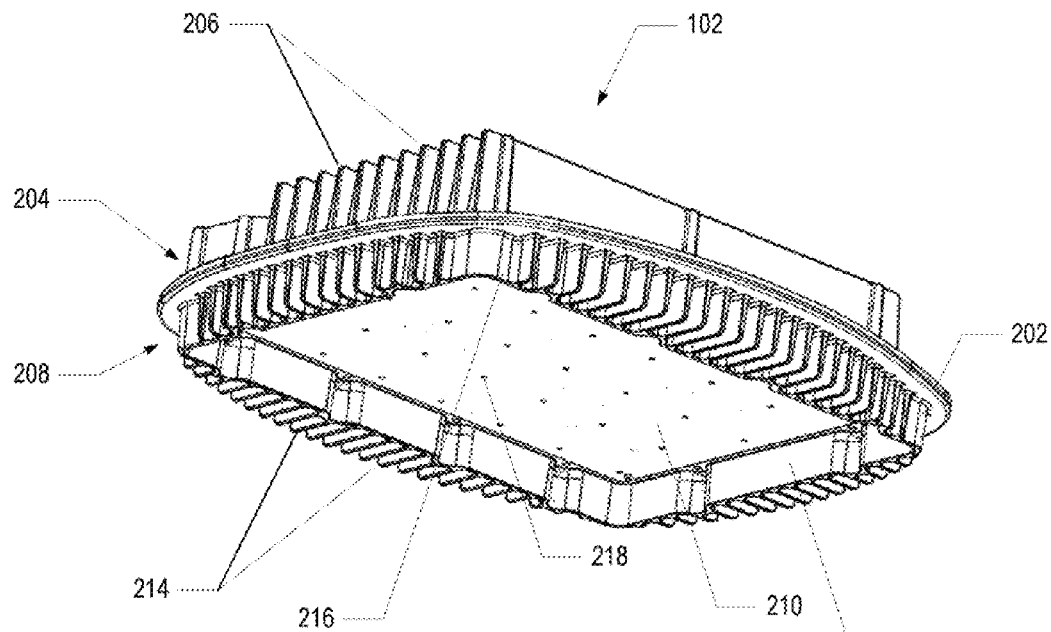
FIGS. 2A-2D and 2F are isometric diagrams of a chassis, lighting circuit, and lighting optics according to aspects of the LED light engine.

FIG. 2A depicts the chassis 102 according to one aspect of the LED light engine 100. The chassis 102 includes a mounting interface that enables the chassis 102 to be attached to a luminaire. According to one aspect, the mounting interface corresponds to a central portion 202 of the chassis 102. The central portion 202 can be secured to the lid of a luminaire via retention clips and/or retention brackets located on the lid, screws and bolts, or any other fasteners. For example, as explained in more detail below, a retention clip and retention brackets previously used to secure a lens cover to the lid of an existing luminaire can be used to secure the chassis 102 to the lid of an existing luminaire. As a result, the central portion 202 allows the LED light engine 100 to be connected to an existing luminaire that uses incandescent, fluorescent, HID, or other lighting components.

According to one aspect, the chassis 102 is a monolithic cast aluminum chassis 102 that serves as a heat sink to transfer heat generated by the LEDs 108 upward into a luminaire housing and to transfer heat out of the luminaire into the ambient air environment. For example, an upper side 204 of the chassis 102 includes a plurality of upper fins 206 that extend vertically upward to dissipate heat into an interior of the luminaire housing, such as a luminaire housing 304 shown in FIG. 3A. That is, the upper fins 206 are located in the interior of the luminaire between the central flanged portion 202 of the chassis and the luminaire housing. A lower side 208 of the chassis 102 includes a mounting surface 210 that is defined by and surrounded by a fin wall 212 that depends from the central flanged portion 202. A plurality of lower fins 214 extend from an outer surface 216 of the fin wall 212 such that the lower fins 214 are along the periphery of the mounting surface 210 and extend below the mounting surface 210. According to one aspect, the fins extend vertically downward from the central flanged portion 202 and extend horizontally outward from the fin wall 212. In other aspects, the fins 214 may extend at angles from the central flanged portion 202 and/or the fin wall 212. As described below, when the LED light engine 100 is installed in a luminaire, the lower fins 214 extend below the luminaire to dissipate heat into the ambient air outside of the luminaire housing. As used herein, ambient air refers to the air outside of the luminaire housing. During operation of the LEDs 108, the chassis 102 transfers heat away from the lighting circuit 104 through radiation and convection in both upward and downward directions. In this embodiment, the heat dissipated via the upper fins 206 is exchanged through air within the interior of the housing and then exchanged through the housing into the ambient air. However, the heat dissipated by the lower fins 214 is exchanged directly with the ambient air and, thus, increases the rate at which heat is dissipated from the luminaire.

Figure 2B:
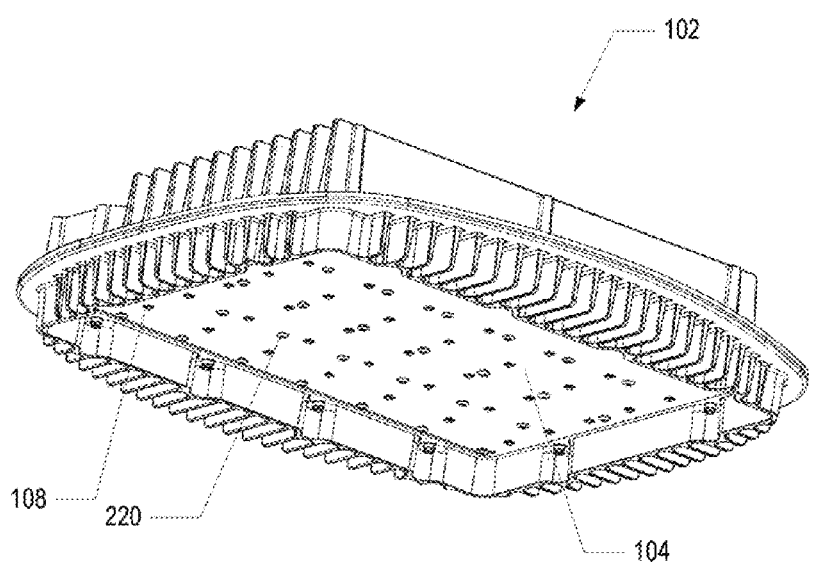

The mounting surface 210 may include multiple receiving interfaces 218, such as holes, openings, or other receiving interfaces that enable the lighting circuit 104 and other lighting components to be mounted or attached to the mounting surface 210. For example, the lighting circuit 104 can be attached to the mounting surface 210 via mounting screws 220, such as shown in FIG. 2B, which connect to receiving interfaces 218 via mating threads. According to one aspect, a heat-conducting pad, such as the thermal pad 110, is positioned between the lighting circuit 104 and the mounting surface 210 to provide optimal thermal contact between the lighting circuit 104 and the chassis body 102 to maximize heat dissipation.

Figure 2C:
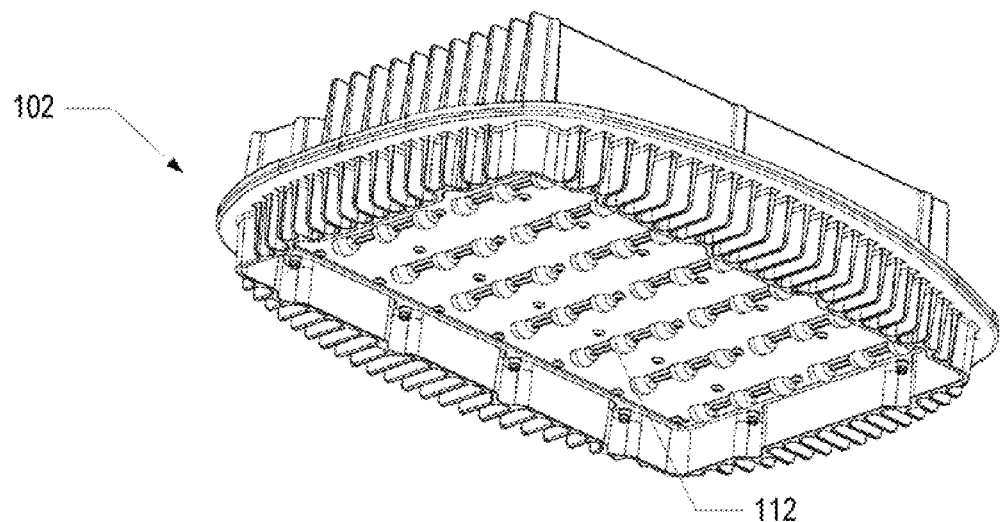
Figure 2D:
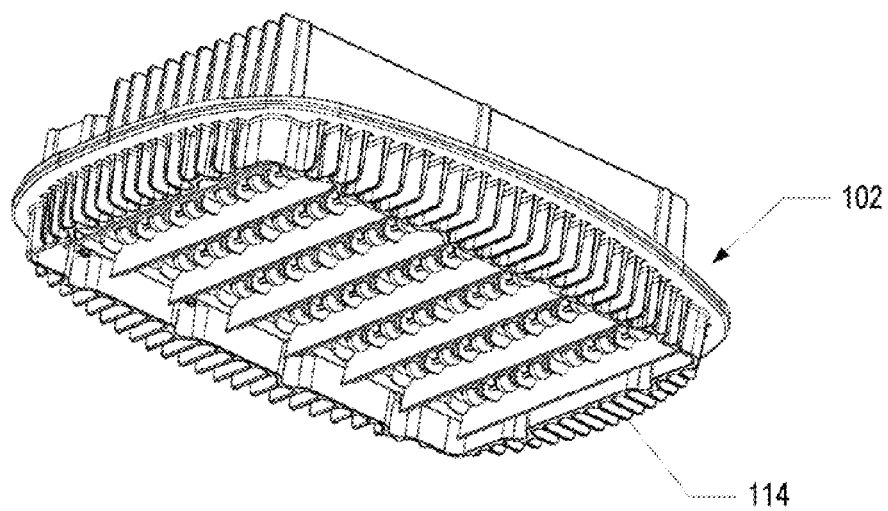

The optics 106, including the optical lens assemblies 112 and the reflectors 114, may be mounted to the mounting surface 210 via the mounting screws 220 or other fasteners. For example, the optical lens 116 of the optical lens assemblies 112 can be mounted over the LEDs 108 via the mounting surface 210 as shown in FIG. 2C. Similarly, the reflectors 114 can be mounted over the optical lens 116 via the mounting surface 210 as shown in FIG. 2D.

In addition to the optics 106 directing light toward a target area, the fin wall 212 eliminates the potential of providing light in unwanted directions. For example, because the LEDs 108 are recessed with respect to the fin wall 212, the fin wall 212 serves as a baffle and prevents light from being emitted above a horizontal plane that intersects the bottom of the chassis 102. In other words, because the fin wall 212 surrounds the optics 106, the fin wall 212 prevents light from being emitted directly into the sky.

Figure 2E:
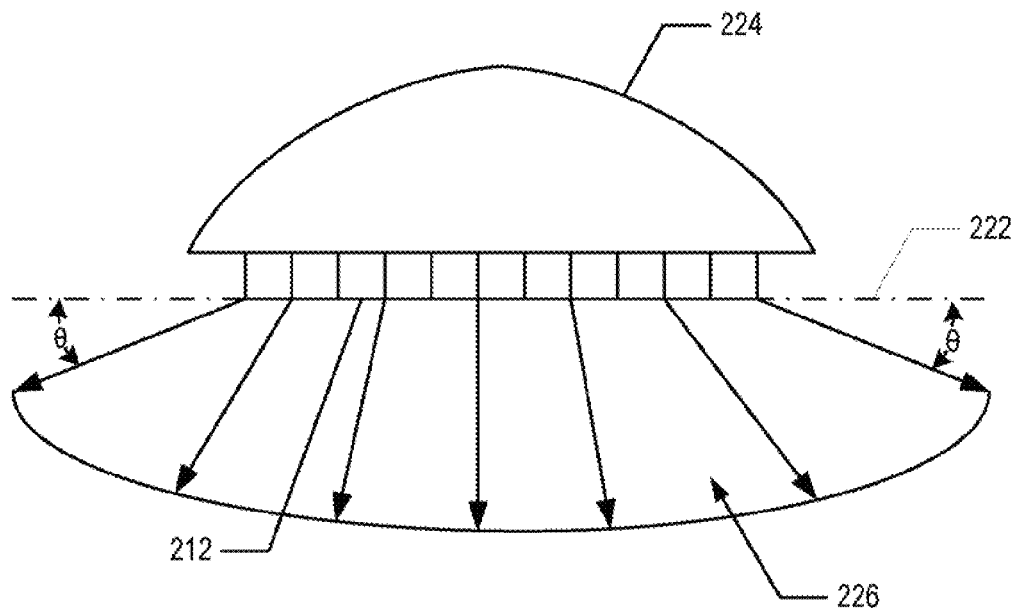
FIG. 2E depicts a generated light pattern according to one aspect of the LED light engine.

For example, FIG. 2E depicts a horizontal plane 222 that intersects the bottom of a chassis 102 of an exemplary luminaire 224. In this example, the bottom of the luminaire 224 corresponds to the bottom of the fin wall 212. The height of the fin wall 212 can be dimensioned to prevent light within a desired light pattern, as indicated by 226, from being emitted above a target angle, θ, with respect to the horizontal plane 222. For example, according to one aspect, the target angle, θ, is, between 5 to 10 degrees below the horizontal plane 222. Thus, the height of the fin wall 212 can be dimensioned to prevent light from being emitted above a five-degree angle with respect to the horizontal plane 222. Other angles may be used. As a result, the fin wall 212 allows the luminaire to meet International Dark Sky Association criteria for preventing light pollution caused by light being emitted into the sky, and to meet the (Draft Jul. 1, 2009) USDOE Energy Star requirements for outdoor solid state light sources which limit the amount of light emitted above and immediately below the horizontal plane intersecting the bottom of the luminaire 302.

Figure 2F:
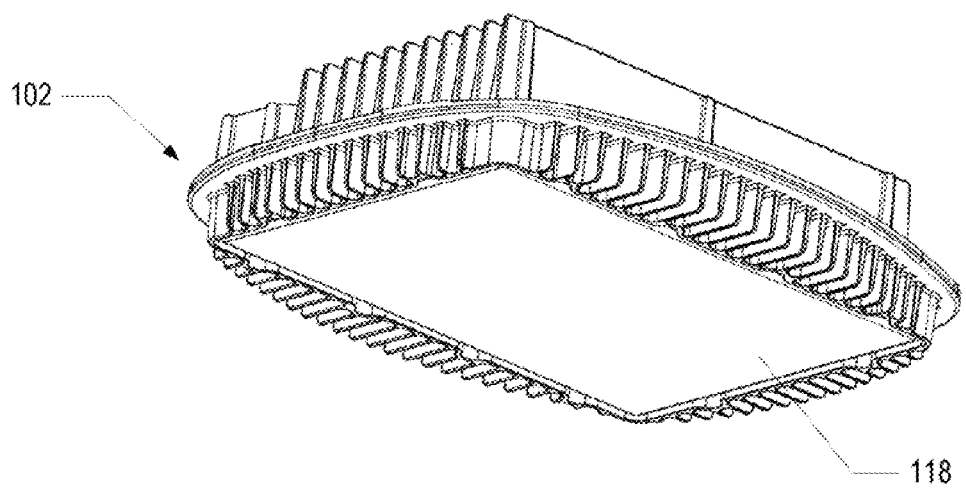

Moreover, as shown in FIG. 2F, the acrylic cover 118 and gasket 120 can also be attached to the chassis 102 to provide a protective covering for the circuit 104 and the optics 106. According to one aspect, as shown in FIG. 1, the openings 122 in the cover 118 are within threaded metal bosses 134 that are integrated into the cover 118, for example, during a molding process of the cover 118. To mount the cover 118 to the chassis 102, mounting screws 220 are inserted downward, from the upper side 204 of the chassis 102, through openings 120 in the chassis 102, circuit 104, and gasket 120 that match the location of the metal bosses 134 on the cover 118. A threaded portion of the metal boss 134 receives the threaded portion of the mounting screw 220. As a result, after the cover 118 is secured to the chassis 102, the mounting screw 220 is not visible from the lower side 208 of the chassis 102.

Figure 3A:
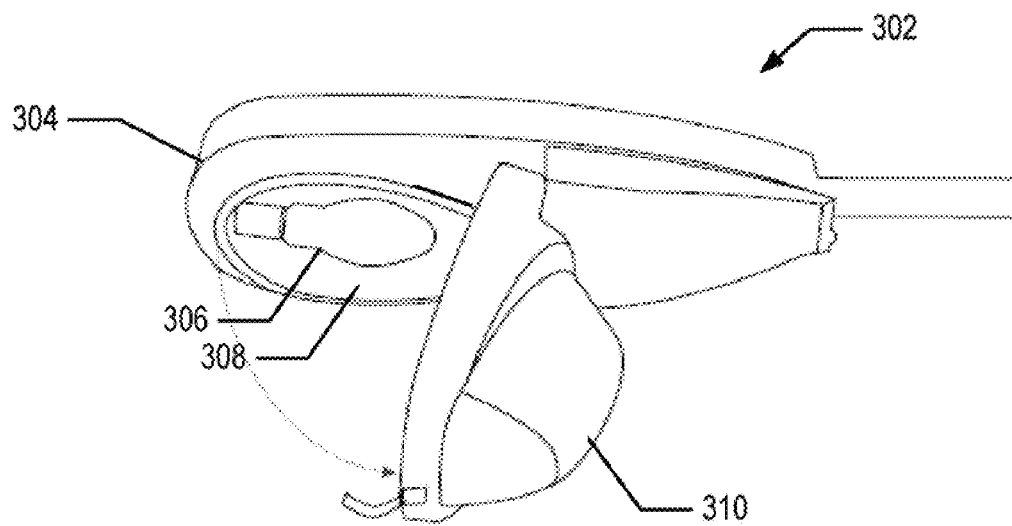
FIGS. 3A-3D depict various stages of retrofitting an existing luminaire with the LED light engine.
Figure 3B:
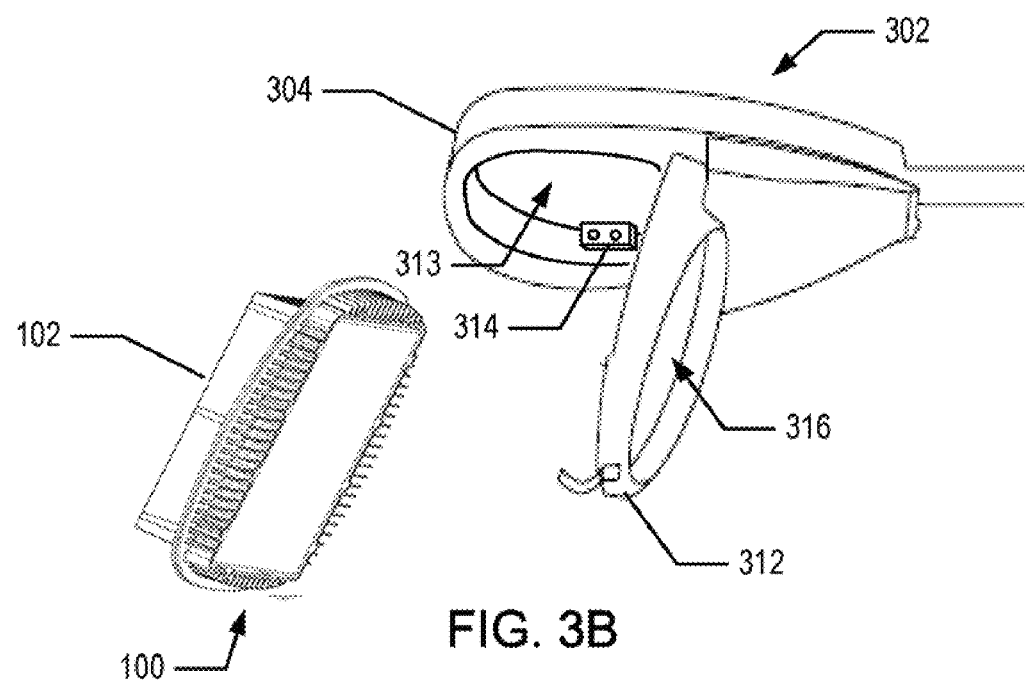

FIGS. 3A-3D depict various stages of a retrofitting process for an existing luminaire 302 with the LED light engine 100 according to one aspect of the invention. In this example, the existing luminaire 302 includes a housing 304, a lamp 306, a reflector 308, and a lens cover 310 as shown in FIG. 3A. The lamp 306 and reflector 308 are removed from the housing 304 and the lens cover 310 is removed from a lid 312 of the luminaire 302, as shown in FIG. 3B. After the reflector is removed, an interior 313 of the housing 304 can be accessed. A power terminal block 314 that is connected to an AC voltage supply can also be accessed. After the lens cover 310 is removed, there is an opening 316 in the lid 312.

Figure 3C:
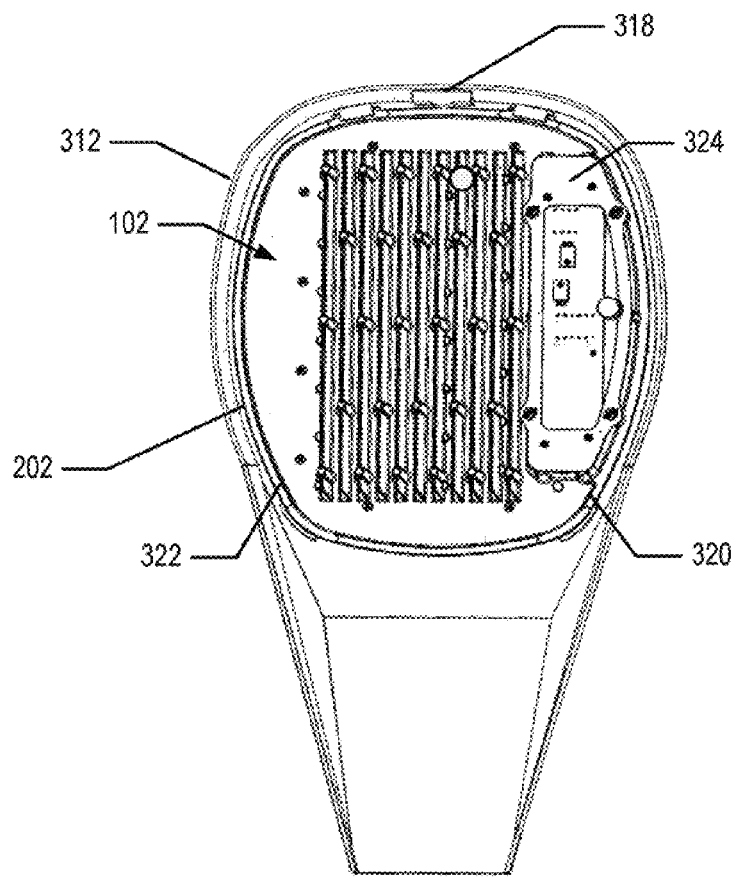
Figure 3D:
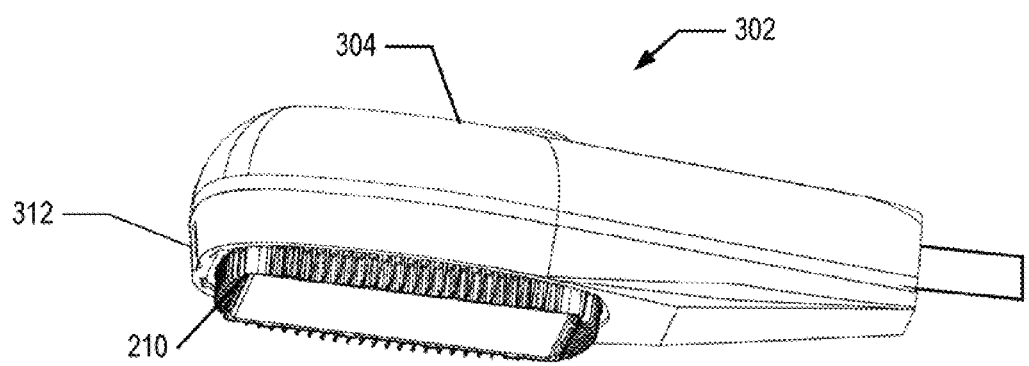

As shown in FIG. 3C, the lower side 208 of chassis 102 is placed through the lid opening 316 and a retention clip 318 and retention brackets 320, 322 located on the interior of the lid 312 are used to secure the chassis 102 to the lid 312. For example, the lower side 208 of the chassis 102 fits through the lid opening 316 and one end of the central flanged portion 202 of the chassis is positioned beneath the brackets 320, 322. The retention clip 318 is then rotated, or otherwise actuated or positioned, to secure the opposite end of the central flanged portion 202. As explained in more detail below in reference to FIG. 4, a current driver that is housed in a cavity 324 of the upper side 204 of the chassis 102 includes input leads that connect to the terminal block 314 in the housing of the luminaire 302. The lid 312 is closed and the lower fins 214 extend below the luminaire 302 as shown in FIG. 3D.

Figure 4:
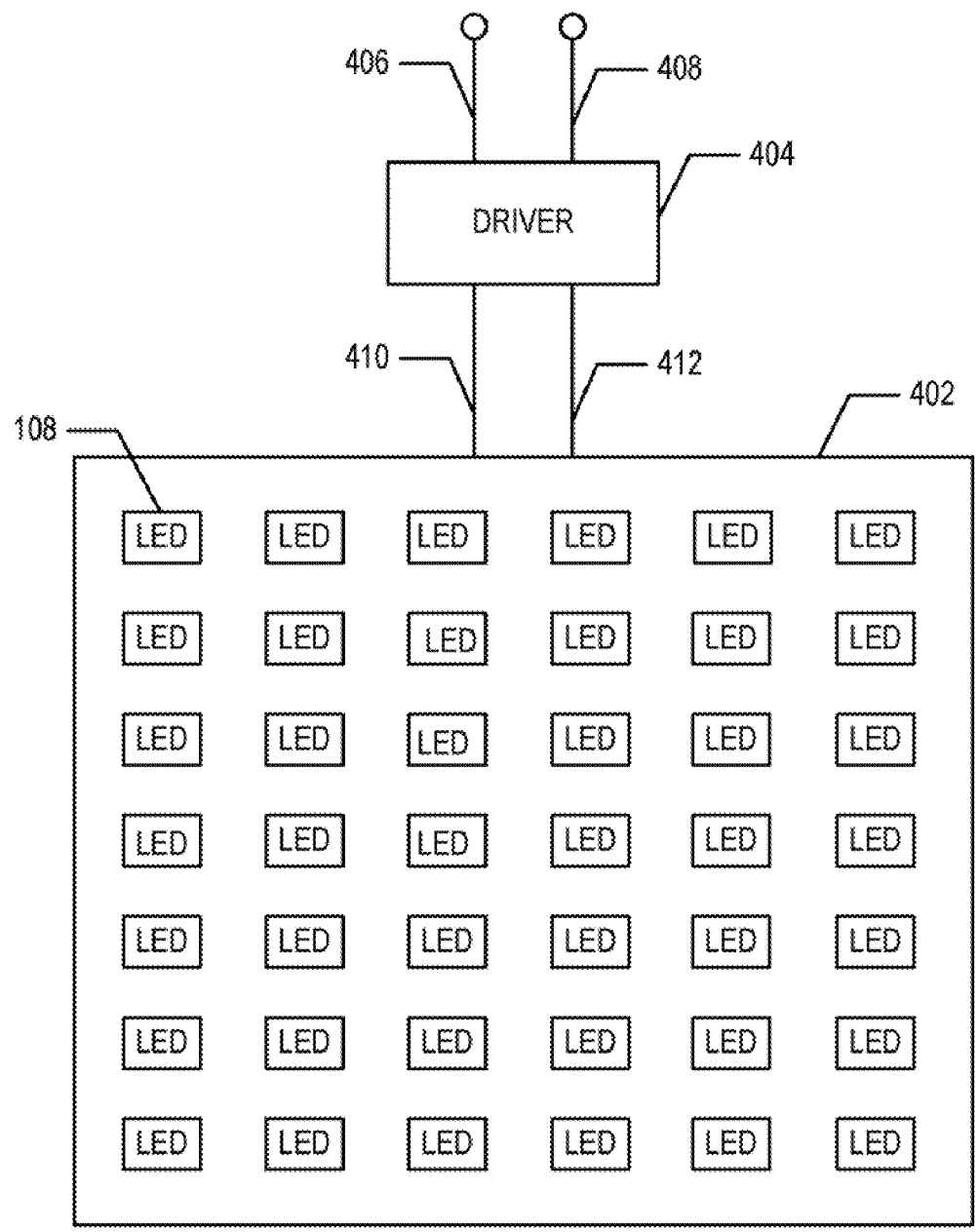
FIG. 4 is a block diagram depicting a lighting circuit and a driver according to one aspect of the LED light engine.

FIG. 4 depicts a PCB 402 according to one aspect of the LED light engine 100. The PCB 402 includes an optical assembly that includes an array of high power LEDs 108. For example, there are six rows and seven columns of LEDs 108, or 42 LEDs 108, mounted on the PCB 402 depicted in FIG. 4. It is contemplated, however, that the optical assembly may include a different number of rows and/or columns of LEDs. Alternatively, the LEDs 108 may be configured in another pattern, such as a circular pattern, a star pattern, or another shape or pattern, and the optics and the trough reflectors are configured for the selected pattern. For example, the optics 106 including the lens assemblies 112 and trough reflectors 114 may be configured as concentric circles, semicircles, polygons, or other shapes or patterns. Similarly, the chassis 102, circuit board 104, and other components can be configured for the selected shape or pattern.

An AC to DC power converter, such as a current driver 404 ("driver"), converts an input line AC voltage (e.g., 100-277 VAC) to a constant DC current to drive the LEDs and generate light. For example, the driver 404 includes power connections, such as input lead wires 406, 408 that connect to the power terminal block 314 within the housing of a luminaire, such as luminaire 302. The power terminal block 314 is, for example, connected to the AC line voltage supply. The input lead wires 406, 408 connect to a positive connection and a neutral connection, respectively, of the terminal block 314. According to another aspect, the driver 404 includes a ground lead wire (not shown) that is connected to a ground connection of the terminal block 314. The driver 404 also includes output leads 410, 412 that are connected to the PCB 402 to provide operational current to the LEDs 108.

Figure 5A:
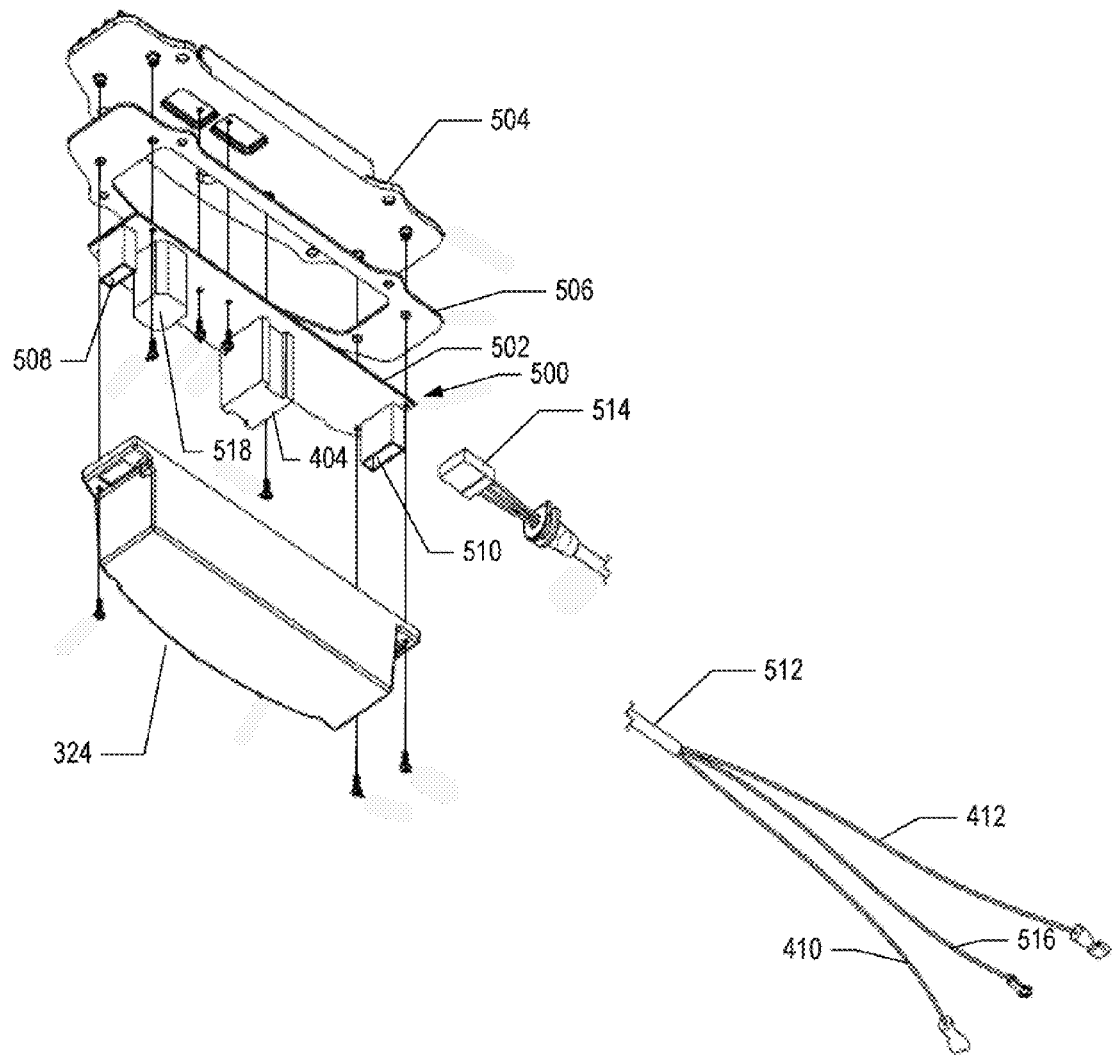
FIG. 5A depicts a driver assembly according to one aspect of the LED light engine.

In one embodiment, the driver 404 is configured to fit within the cavity 324 on the upper side 204 of the chassis 102. For example, FIG. 5A depicts a driver assembly 500 that includes a driver circuit board 502 with a current driver 404. The driver assembly 500 fits within the cavity 324. According to one aspect, the driver assembly 500 is attached to an aluminum lid 504 that includes independent heat sinks (not shown) for dissipating heat created by the driver 404. A gasket 506 is placed between the lid 504 and the chassis 102 to provide protection from any moisture that may exist within the luminaire 302.

According to another aspect, the driver assembly 500 includes input and output circuit board terminal blocks 508, 510. The input and output circuit board terminal blocks 508, 510 are configured to receive wiring harness plugs for receiving AC power and conveying DC power, respectively. For example, an output wiring harness 512 includes a plug 514 that connects to the output circuit board terminal block 510. In this example, the output wiring harness 512 includes output leads 410, 412, and a ground lead 516. Although not shown in FIG. 5A, an input wiring harness, that includes input leads 406, 408 and a ground wire, can be connected to the input connector 508. According to one aspect, the output leads 410, 412 are routed through holes in the chassis 102 to connect to the PCB 402.

The driver 404 operates at a variety of user-selected current settings and employs pulse width modulation (PWM) technology to provide variable current control. For example, PWM can be used to control the pulse width and duty cycle of the DC power being provided to the LEDs 108 to vary the intensity of the light emitted from the LEDs 108. PWM dimming is achieved by periodically, and for a short period, reducing the DC power being provided to the LEDs 108 to zero to turn the LEDs 108 off and on. Turning the LEDs off and on in such a manner is perceived by the human eye as a dimming effect. To produce an increased dimming effect, the DC power level is reduced to zero for a longer period.

Figure 5B:
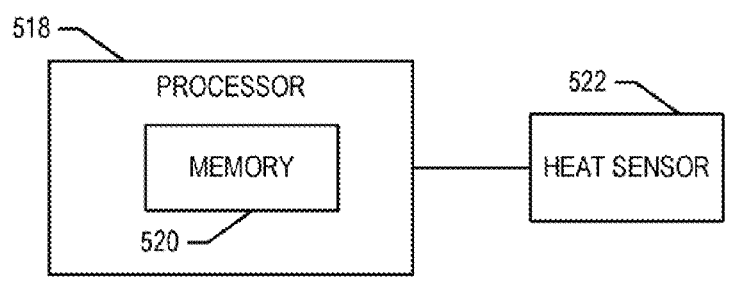
FIG. 5B is a block diagram depicting processing and heat sensing components according to one aspect of the LED light engine.

According to one aspect shown in FIG. 5B, a processor 518, such as a programmable microprocessor, is used to control the driver 404 to turn the DC power on and off at the appropriate frequency and pulse width. Accordingly, operators can configure the processor 518 to adjust DC power levels output from the driver 404 and, thus, dim or reduce the amount of light output from the LEDs 108.

According another aspect, the processor 518 includes a memory 520 and tracks the total number of hours of operation for the LEDs 108 for storage in the memory 518. As a result, operators can later collect data from the memory 520, such as during routine servicing of a luminaire, to verify whether the LED light engine 100 is operating and/or being used in accordance with design specifications.

According to another aspect, the LED light engine 100 includes a heat sensor 522 for sensing a temperature in the luminaire 302 and for generating a temperature signal that includes the sensed temperature. The processor 518 processes the temperature signal to identify the sensed temperature and compares the sensed temperature to a threshold temperature stored in the memory 520. The processor 518 generates a power off control signal when the temperature exceeds the threshold value and transmits the power off control signal to the driver 404. The driver 404 converts the AC power to DC power at a DC power level equal to zero in response the power off control signal, thus turning off the LEDs 108.

Figure 6A:
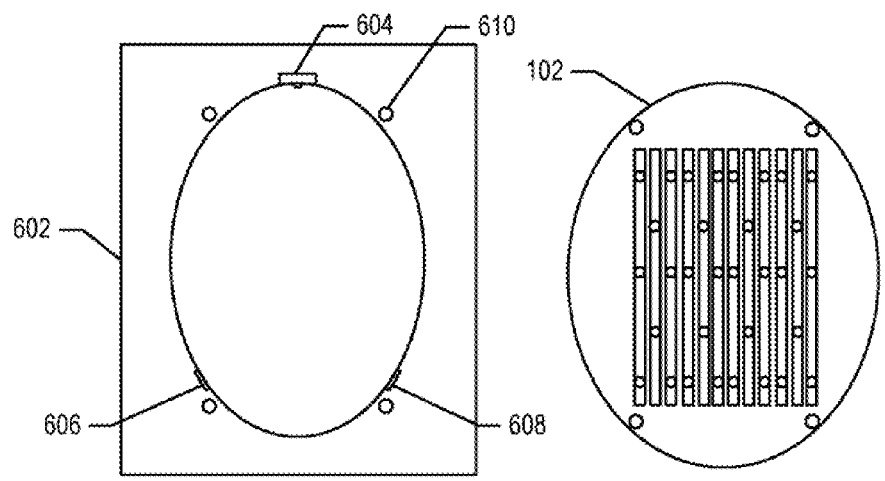
FIGS. 6A-6C depict an adapter plate for connecting the LED light engine to an existing luminaire.

FIG. 6A depicts an adaptor plate 602 configured to connect to the chassis 102 according to one aspect of the LED light engine 100. Because existing street light luminaires 302 can have various shapes, the adaptor plate 602 allows existing luminaires 302 of various shapes to be retrofitted with the LED light engine 100. For example, the chassis 102 is secured to the adaptor plate 602 via a retention clip 604 and retention brackets 606, 608 or other fasteners. The retention clips 604 and retention brackets 606, 608 are, for example, the same as the retention clip 318 and retention brackets 320, 322 described above in connection with FIGS. 3A-3C. The adaptor plate 602 can also be secured to the existing luminaire 302 and chassis 102 via mounting screws 220 or other mounting hardware through mounting holes 610. The mounting plate 602 with the attached chassis 102 then can be mounted in the existing luminaire 302.

For example, an existing lamp (not shown) and existing reflector (not shown) are removed from the housing 304 and an existing lens cover (not shown) is removed from a lid 612 of the luminaire 302. After the reflector is removed, the power terminal block 314 located in the housing can be accessed. The terminal block 314 is connected to an AC voltage supply. After the lens cover is removed, there is an opening 614 in the lid 612. The mounting plate 602 with the attached the chassis 102 is positioned on the interior side of the lid 612 such that the lower side 208 of the chassis 102 is placed through the lid opening 614, and the adaptor plate 602 is secured to interior of the lid 612 of the existing luminaire 302 via mounting screws 220, or other mounting hardware.

Figure 6B:
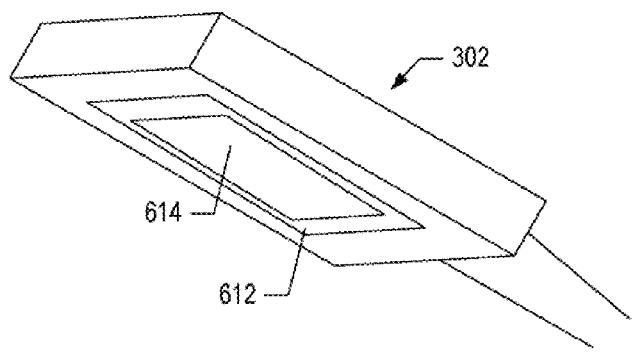
Figure 6C:
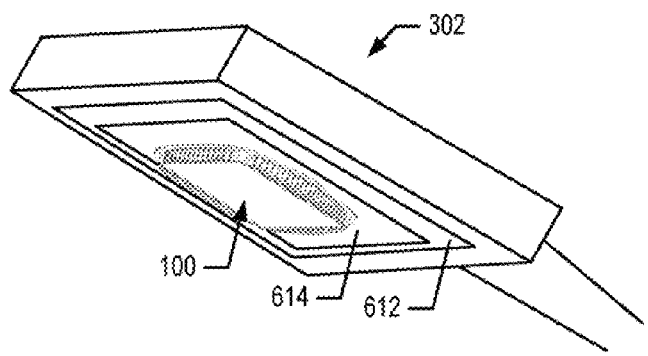

FIGS. 6B and 6C depict before and after views, respectively, of an existing street light luminaire 302 retrofitted with the LED light engine 100 via the exemplary adaptor plated 602 depicted in FIG. 6A. In this example, the existing street light luminaire 302 has a substantially rectangular shape, and the opening 614 of the existing luminaire is larger than the chassis 102 of the LED light engine 100. It is contemplated, however, that adapter plates 602 can vary in shape to accommodate specific shapes of other existing luminaires. The adaptor plate 602 in this example is used to mount the chassis 102 through an opening 614 in the lid 612 of a luminaire 302 that is larger than the chassis 102. In other examples, the mounting plate 602 is used to mount the chassis 102 to luminaires whose openings are of different shapes than the shape of the chassis 102.

Those skilled in the art will appreciate that variations from the specific embodiments disclosed above are contemplated by the invention. The invention should not be restricted to the above embodiments, but should be measured by the following claims.

What is claimed is:

1. A light engine comprising:
at least one power connector to connect to a power source to convey alternating current (AC) power;
an AC to direct current (DC) power converter to:
receive the AC power via the at least one power connector; and
convert the AC power to DC power at a DC power level;
a circuit board comprising:
a plurality of light emitting diodes (LEDs) to receive the DC power and to emit light; and
lighting optics to distribute the light emitted from the LEDs; and
a chassis comprising:
a first side comprising a plurality of first fins extending upward to dissipate heat in a first direction; and
a second side comprising:
a mounting surface for the circuit board;
a fin wall surrounding the mounting surface, the fin wall comprising an inner surface to prevent the light from being emitted from the chassis in a direction from above less than a five degree angle below a reference plane intersecting a bottom surface of the chassis; and
a plurality of second fins extending outward from an outer surface of the fin wall to dissipate heat in a second direction.

2. The light engine of claim 1 wherein the chassis comprises a monolithic cast aluminum heat sink.

3. The light engine of claim 1 wherein each of the plurality of LEDs emitting light generates the heat.

4. The light engine of claim 3 further comprising a heat conducting pad positioned between the circuit board and the mounting surface to transmit at least some of the heat generated by the plurality of LEDs to the chassis.

5. The light engine of claim 1 wherein the AC to DC power converter converts the AC power to the DC power at an adjustable DC power level.

6. The light engine of claim 1 wherein the at least one power connector comprises a pair of lead wires configured to connect to existing AC power supply lines in a luminaire.

7. The light engine of claim 1 wherein the light engine is configured to be located within a housing of a luminaire, and wherein the plurality of first fins are configured to dissipate the heat into an interior of the housing.

8. The light engine of claim 7 wherein the plurality of second fins dissipate heat directly into ambient air outside of the housing.

9. The light engine of claim 7 wherein the luminaire has an opening that is a different shape or different size than a shape or a size of the chassis and the light engine further comprises an adaptor plate to enable mounting the chassis to the luminaire having the different shape or the different size.

10. The light engine of claim 7 wherein:
the luminaire comprises a lid comprising an opening, a retention clip, and at least one retention bracket; and the chassis comprises a central portion that comprises a mounting interface, wherein an end of the mounting interface is configured to be positioned beneath the at least one retention bracket such that the plurality of second fins pass through the opening, and wherein an opposite end of the mounting interface is configured to be secured to the lid by the retention clip.

11. The light engine of claim 1 wherein the first side of the chassis further comprises a cavity for housing the AC to DC power converter.

12. The light engine of claim 1 further comprising a cover for covering the circuit board and the lighting optics.

13. The light engine of claim 1 wherein the inner surface of the fin wall comprises a baffle to prevent the light from being emitted from the chassis in the direction from above less than the five degree angle below the reference plane intersecting the bottom surface of the chassis.

14. The light engine of claim 1 wherein the reference plane comprises a horizontal plane and wherein a height of the fin wall is dimensioned to prevent the light from being emitted from the chassis in the direction from above less than the five degree angle below the horizontal plane intersecting the bottom surface of the chassis.

15. The light engine of claim 1 wherein the reference plane comprises a horizontal plane and wherein a height of the fin wall is dimensioned to prevent the light from being emitted from the chassis in a direction from above less than a ten degree angle below the horizontal plane intersecting the bottom surface of the chassis.

16. The light engine of claim 1 wherein the lighting optics comprise:
a plurality of optical lenses to disperse the light, wherein each of the plurality of optical lenses is positioned over a different one of the plurality of LEDs; and
a plurality of optical reflectors each positioned over at least one of the optical lenses to reflect the light dispersed by the at least one of the optical lenses.

17. The light engine of claim 1 further comprises a processor to:
generate a control signal to control the AC to DC power converter to convert the AC power to the DC power at the DC power level;
track a total operation time for the plurality of LEDs; and store the total operation time in a memory.

18. The light engine of claim 17 wherein the processor is further configured to:
modify the control signal via pulse width modulation in response to user input;
transmit the modified control signal to the AC to DC power converter to modify the DC power to a modified DC power level to modify an amount of light being emitted by the plurality of LEDs.

19. The light engine of claim 17 further comprises:
a heat sensor to sense a temperature in the luminaire; and
wherein the processor is further configured to:
generate a power off control signal when the temperature exceeds a threshold value stored in the memory; and
transmit the power off control signal to the AC to DC power converter to convert the AC power to the DC power at the DC power level equal to zero.

20. The light engine of claim 1 wherein the light engine comprises a light engine retrofit to retrofit an existing luminaire comprising a lid with an opening and the chassis comprises a central portion that comprises a mounting interface to mount the chassis to the existing luminaire with the plurality of second fins of the chassis passing through the opening of the lid so that, when mounted, the plurality of second fins are exposed to air outside of the light fixture.

21. A lighting fixture comprising:
a housing;
a terminal block for supplying alternating current (AC) power; and
a light engine comprising:
at least one power connector to connect to the terminal block to convey the AC power;
an AC to direct current (DC) power converter to:
receive the AC power via the at least one power connector; and
convert the AC power to DC power at a DC power level;
a circuit board comprising:
a plurality of light emitting diodes (LEDs) to receive the DC power and to emit light; and
lighting optics to distribute the light emitted from the LEDs from the lighting fixture in a desired light pattern; and
a chassis to mountably fit within the lighting fixture, the chassis comprising:
a central portion;
a first side comprising a plurality of first fins extending vertically upward from the central portion to dissipate heat in a first direction; and
a second side comprising:
a mounting surface for the circuit board;
a fin wall depending from the central portion and surrounding
the mounting surface, the fin wall comprising an inner surface to prevent the light from being emitted from the chassis in a direction from above less than a five degree angle below a reference plane intersecting a bottom surface of the chassis; and
a plurality of second fins extending horizontally outward from an outer surface of the fin wall to dissipate heat in a second direction.

22. The lighting fixture of claim 21 wherein the chassis comprises a monolithic cast aluminum heat sink.

23. The lighting fixture of claim 21 wherein the plurality of first fins dissipate the heat into an interior of the housing.

24. The lighting fixture of claim 21 wherein the plurality of second fins dissipate the heat directly into ambient air outside of the housing.

25. The lighting fixture of claim 21 wherein each of the plurality of LEDs emitting light generates at least some of the heat.

26. The lighting fixture of claim 25 further comprising a heat conducting pad positioned between the circuit board and the mounting surface to transmit at least some of the heat generated by the plurality of LEDs to the chassis.

27. The lighting fixture of claim 21 wherein the AC to DC power converter comprises a current driver to convert the AC power to the DC power at an adjustable DC current level.

28. The lighting fixture of claim 21 wherein the at least one power connector comprises a pair of lead wires configured to connect to AC power supply lines of the lighting fixture.

29. The lighting fixture of claim 21 further comprising:
a lid comprising an opening, a retention clip, and a retention bracket; and
wherein the central portion further comprises a mounting interface, wherein an end of the mounting interface is positioned beneath the retention bracket such that the plurality of second fins pass through the opening, and wherein an opposite end of the mounting interface is secured to the lid by the retention clip.

30. The lighting fixture of claim 21 wherein the first side of the chassis further comprises a cavity for housing the AC to DC power converter.

31. The lighting fixture of claim 21 wherein the inner surface of the fin wall comprises a baffle to prevent the light from being emitted from the lighting fixture in the direction from above less than the five degree angle below the reference plane intersecting the bottom surface of the chassis.

32. The lighting fixture of claim 21 wherein the reference plane comprises a horizontal plane and wherein a height of the fin wall is dimensioned to prevent the light from being emitted from the lighting fixture in the direction from above less than the five degree angle below the horizontal plane intersecting the bottom surface of the chassis.

33. The lighting fixture of claim 21 wherein the lighting optics comprise:
   a plurality of optical lenses to disperse the light, wherein each of the plurality of optical lenses is positioned over a different one of the plurality of LEDs; and
   a plurality of optical reflectors each positioned over at least one of the optical lenses to reflect the light dispersed by the at least one of the optical lenses to create the desired light pattern.

34. The lighting fixture of claim 21 further comprises a processor to:
   generate a control signal to control the driver to convert the AC power to the DC power at the DC power level;
   track a total operation time for the plurality of LEDs; and
   store the total operation time in a memory.

35. The lighting fixture of claim 34 wherein the processor is further configured to:
   modify the control signal via pulse width modulation in response to user input; and
   transmit the modified control signal to the driver to modify the DC power to a modified DC power level to modify an amount of light being emitted by the plurality of LEDs.

36. The lighting fixture of claim 34 further comprising:
   a heat sensor to sense a temperature in the lighting fixture; and
   wherein the processor is further configured to:
      generate a power off control signal when the temperature exceeds a threshold value stored in the memory; and
      transmit the power off control signal to the AC to DC power converter to convert the AC power to the DC power at the DC power level equal to zero.

37. A light engine retrofit for retrofitting an existing light fixture having a lid comprising an opening, a retention clip, and at least one retention bracket, the light engine comprising:
   at least one power connector to connect to a power source of the existing lighting fixture to convey alternating current (AC) power;
   a current driver to:
      receive the AC power via the at least one power connector; and
      convert the AC power to direct current (DC) power at a DC power level;
   a circuit board comprising:
      a plurality of light emitting diodes (LEDs) to receive the DC power and to emit light;
      a plurality of optical lenses to disperse light, wherein each of the plurality of optical lenses is positioned over a different one of the LEDs; and
      a plurality of optical reflectors each positioned over at least one of the optical lenses to reflect the light dispersed by the lenses to create the desired light pattern; and
   a chassis comprising:
      a central portion;
      a first side comprising a plurality of first fins extending upward from the central portion to dissipate heat in a first direction; and
      a second side comprising:
         a mounting surface for the circuit board;
         a fin wall depending from the central portion and fully surrounding the mounting surface; and
         a plurality of second fins extending outward from an outer surface of the fin wall to dissipate heat in a second direction;
      wherein the central portion comprises a mounting interface for mounting the chassis to the lid of the existing light fixture, wherein an end of the mounting interface is configured to be positioned beneath the retention bracket such that the plurality of second fins pass through the opening, and wherein an opposite end of the mounting interface is configured to be secured to the lid by the retention clip.

38. The light engine retrofit of claim 37, wherein a height of the fin wall is dimensioned to prevent the light from being emitted from the chassis in a direction from above less than a five degree angle below a horizontal plane intersecting a bottom surface of the chassis.

39. The light engine retrofit of claim 37, wherein a height of the fin wall is dimensioned to prevent the light from being emitted from the chassis in a direction from above less than a five degree angle below a reference plane intersecting a bottom surface of the chassis.

40. The light engine retrofit of claim 37, wherein a height of the fin wall is dimensioned to prevent the light from being emitted from the chassis in a direction above a horizontal plane intersecting a bottom surface of the chassis.

41. A light engine comprising:
   a driver assembly comprising:
      at least one power connector to connect to a power source to convey alternating current (AC) power;
      an AC to direct current (DC) power converter to receive the AC power via the at least one power connector and convert the AC power to DC power at a DC power level; and
      a processor to generate a control signal to control the AC to DC power converter to convert the AC power to the DC power at the DC power level;
   a circuit board comprising:
      a plurality of light emitting diodes (LEDs) to receive the DC power and to emit light; and
      lighting optics to distribute the light emitted from the LEDs in a desired light pattern; and
   a chassis comprising:
      a central portion;
      a first side comprising a plurality of first fins extending vertically upward from the central portion to dissipate heat in a first direction; and
      a second side comprising:
         a mounting surface for the circuit board;
         a fin wall depending from the central portion and surrounding the mounting surface, wherein an inner surface of the fin wall prevents the light from being emitted from the light engine in a direction from above less than a five degree angle below a horizontal plane intersecting a bottom surface of the chassis; and a plurality of second fins extending horizontally outward from an outer surface of the fin wall to dissipate heat in a second direction.

42. The light engine of claim 41 wherein the processor is further configured to:
track a total operation time for the plurality of LEDs; and
store the total operation time in a memory.

43. The light engine of claim 41 wherein the processor is further configured to:
modify the control signal via pulse width modulation in response to user input; and
transmit the modified control signal to the AC to DC converter to modify the DC power to a modified DC power level to modify an amount of light being emitted by the plurality of LEDs.

44. The light engine of claim 41 further comprising:
a heat sensor to sense a temperature in a luminaire; and
wherein the processor is further configured to:
generate a power off control signal when the temperature exceeds a threshold value stored in the memory; and
transmit the power off control signal to the AC to DC power converter to convert the AC power to the DC power at the DC power level equal to zero.

45. The light engine of claim 41 wherein:
the light engine comprises a light engine retrofit for a luminaire comprising a lid having an opening; and
the light engine further comprises an adaptor plate to mount the plurality of second fins of the chassis through the opening of the lid so that, when mounted, the plurality of second fins are exposed to air outside of the luminaire.

46. The light engine of claim 41 wherein the light engine comprises a light engine retrofit to retrofit an existing luminaire comprising a lid with an opening and the chassis comprises a central portion that comprises a mounting interface to mount the chassis to the existing luminaire with the plurality of second fins of the chassis passing through the opening of the lid so that, when mounted, the plurality of second fins are exposed to air outside of the light fixture.

47. A light engine for a luminaire, the luminaire comprising a housing and a terminal block for supplying alternating current (AC) power, the light engine comprising:
at least one power connector to connect to the terminal block to convey the AC power;
an AC to direct current (DC) power converter to:
receive the AC power via the at least one power connector; and
convert the AC power to DC power at a DC power level;
a circuit board comprising:
a plurality of light emitting diodes (LEDs) to receive the DC power and to emit light; and
lighting optics to distribute the light emitted from the LEDs from the luminaire in a desired light pattern; and
a chassis comprising:
a central portion;
a first side comprising a plurality of first fins extending vertically upward from the central portion to dissipate heat into an interior of the housing; and
a second side comprising:
a mounting surface for the circuit board;
a fin wall depending from the central portion and surrounding the mounting surface, wherein an inner surface of the fin wall blocks the light from being emitted from the chassis in a direction from above less than a five degree angle below a horizontal plane intersecting a bottom surface of the chassis; and
a plurality of second fins extending horizontally outward from an outer surface of the fin wall to dissipate heat directly into ambient air outside of the housing.

48. The light engine of claim 47 wherein:
the light engine comprises a light engine retrofit for a luminaire comprising a lid having an opening; and
the light engine further comprises an adaptor plate to mount the plurality of second fins of the chassis through the opening of the lid so that, when mounted, the plurality of second fins are exposed to air outside of the luminaire.

49. The light engine of claim 47 wherein the light engine comprises a light engine retrofit to retrofit the luminaire, the luminaire comprising a lid with an opening, wherein the chassis comprises a central portion that comprises a mounting interface to mount the chassis to the existing luminaire with the plurality of second fins of the chassis passing through the opening of the lid so that, when mounted, the plurality of second fins are exposed to air outside of the light fixture.

50. A luminaire comprising:
a housing;
a terminal block for supplying alternating current (AC) power; and
a light engine comprising:
at least one power connector to connect to the terminal block to convey the AC power;
an AC to direct current (DC) power converter to:
receive the AC power via the at least one power connector; and
convert the AC power to DC power at a DC power level;
a circuit board comprising:
a plurality of light emitting diodes (LEDs) to receive the DC power and to emit light; and
lighting optics to distribute the light emitted from the LEDs from the luminaire in a desired light pattern; and
a chassis comprising:
a central portion;
a first side comprising a plurality of first fins extending vertically upward from the central portion to dissipate heat into an interior of the housing; and
a second side comprising:
a mounting surface for the circuit board;
a fin wall depending from the central portion and surrounding the mounting surface, wherein an inner surface of the fin wall blocks the light from being emitted from the luminaire in a direction from above less than a five degree angle below a horizontal plane intersecting a bottom surface of the chassis; and
a plurality of second fins extending horizontally outward from an outer surface of the fin wall to dissipate heat directly into ambient air outside of the housing.

51. The luminaire of claim 50 wherein:
the luminaire comprises a lid having an opening; and
the light engine further comprises an adaptor plate to mount the plurality of second fins of the chassis through the opening of the lid and below the adaptor plate so that, when mounted, the plurality of second fins are exposed to air outside of the luminaire.

52. A light engine retrofit to retrofit an existing light fixture comprising a lid with an opening, the light engine retrofit comprising:
a circuit board comprising:
a plurality of light emitting diodes (LEDs) to emit light; and
lighting optics to distribute the light emitted from the LEDs; and
a chassis comprising:
a central portion;
a first side comprising a plurality of first fins extending upward from the central portion to dissipate heat in a first direction;
a second side comprising:
a mounting surface for the circuit board;
a fin wall depending from the central portion and surrounding the mounting surface, the fin wall comprising an inner surface to prevent the light from being emitted from the chassis in a direction from above less than a five degree angle below a reference plane intersecting a bottom surface of the chassis; and
a plurality of second fins to dissipate heat in a second direction; and
a mounting interface to mount the chassis to the existing light fixture with the plurality of second fins of the chassis passing through the opening of the lid so that, when mounted, the plurality of second fins are exposed to air outside of the existing light fixture.

53. The light engine retrofit of claim 52 wherein the fin wall is dimensioned to prevent the light from being emitted from the chassis in the direction from less than the five degree angle below the reference plane intersecting the bottom surface of the chassis.

54. The light engine retrofit of claim 53 wherein the reference plane comprises a horizontal plane.

55. The light engine retrofit of claim 54 wherein the second fins extend outward from an outer surface of the fin wall.

56. The light engine retrofit of claim 55 wherein the opening of the lid of the existing light fixture is a different shape or different size than a shape or a size of the chassis and the light engine retrofit further comprises an adaptor plate to enable mounting the chassis to the existing light fixture having the different shape or the different size.

57. The light engine retrofit of claim 56 wherein the lighting optics comprise:
a plurality of optical lenses to disperse the light, wherein each of the plurality of optical lenses is positioned over a different one of the LEDs; and
a plurality of optical reflectors each positioned over at least one of the optical lenses to reflect the light dispersed by the lenses to create a desired light pattern.

58. The light engine retrofit of claim 57 further comprising:
at least one power connector to connect to a power source to convey alternating current (AC) power; and
a current driver to:
receive the AC power via the at least one power connector; and
convert the AC power to DC power at a DC power level;
wherein the circuit board is configured to receive the DC power at the DC level.

59. The light engine retrofit of claim 54 wherein the lighting optics comprise:

a plurality of optical lenses to disperse the light, wherein each of the plurality of optical lenses is positioned over a different one of the LEDs; and
a plurality of optical reflectors each positioned over at least one of the optical lenses to reflect the light dispersed by the lenses to create a desired light pattern.

60. The light engine retrofit of claim 52 wherein a height of the fin wall is dimensioned to prevent the light from being emitted from the chassis in a direction from above less than a ten degree angle below a horizontal plane intersecting a bottom surface of the chassis.

61. The light fixture of claim 52 wherein the first side is opposite the second side.

62. A light fixture comprising:
a housing comprising an interior and a lid with an opening;
a circuit board comprising:
a plurality of light emitting diodes (LEDs) to emit light; and
lighting optics to distribute the light emitted from the LEDs; and
a chassis comprising:
a central portion;
a first side comprising a plurality of first fins extending toward the interior from the central portion to dissipate heat in a first direction;
a second side comprising:
a mounting surface for the circuit board;
a fin wall depending from the central portion and surrounding the mounting surface, the fin wall comprising an inner surface to prevent the light from being emitted from the chassis in a direction from above less than a five degree angle below a reference plane intersecting a bottom surface of the chassis; and
a plurality of second fins to dissipate heat in a second direction; and
a mounting interface to mount the chassis to the housing with the plurality of second fins of the chassis passing through the opening of the lid so that, when mounted, the plurality of second fins are exposed to air outside of the light fixture.

63. The light fixture of claim 62 wherein the fin wall is dimensioned to prevent the light from being emitted from the chassis in the direction from above less than the five degree angle below the reference plane intersecting the bottom surface of the chassis.

64. The light fixture of claim 63 wherein the reference plane comprises a horizontal plane.

65. The light fixture of claim 64 wherein the second fins extend outward from an outer surface of the fin wall.

66. The light fixture of claim 65 wherein the opening of the lid of the light fixture is a different shape or different size than a shape or a size of the chassis and the light fixture further comprises an adaptor plate to enable mounting the chassis to the light fixture having the different shape or the different size.

67. The light fixture of claim 66 wherein the lighting optics comprise:
a plurality of optical lenses to disperse the light, wherein each of the plurality of optical lenses is positioned over a different one of the LEDs; and
a plurality of optical reflectors each positioned over at least one of the optical lenses to reflect the light dispersed by the lenses to create a desired light pattern.

68. The light fixture of claim 67 further comprising:
at least one power connector to connect to a power source to convey alternating current (AC) power; and a current driver to:
  receive the AC power via the at least one power connector; and
  convert the AC power to DC power at a DC power level;
wherein the circuit board is configured to receive the DC power at the DC level.

69. The light fixture of claim 64 wherein the lighting optics comprise:
  a plurality of optical lenses to disperse the light, wherein each of the plurality of optical lenses is positioned over a different one of the LEDs; and
  a plurality of optical reflectors each positioned over at least one of the optical lenses to reflect the light dispersed by the lenses to create a desired light pattern.

70. The light fixture of claim 63 wherein a height of the fin wall is dimensioned to prevent the light from being emitted from the chassis in a direction from above less than a ten degree angle below a horizontal plane intersecting a bottom surface of the chassis.

71. The light fixture of claim 62 wherein the first side is opposite the second side.

* * * * *